US008308557B2

(12) United States Patent
Bryson et al.

(10) Patent No.: US 8,308,557 B2
(45) Date of Patent: Nov. 13, 2012

(54) TIERED VERIFICATION

(75) Inventors: Andy O. Bryson, San Rafael, CA (US); Zackery E. Derich, San Francisco, CA (US); Ahern P. Knox, San Francisco, CA (US); Crystian Terry, Stratford Upon Avon (GB); Jamie Tsao, San Francisco, CA (US)

(73) Assignee: IGT, Reno, NV (US)

( * ) Notice: Subject to any disclaimer, the term of this patent is extended or adjusted under 35 U.S.C. 154(b) by 795 days.

(21) Appl. No.: 12/356,825

(22) Filed: Jan. 21, 2009

(65) Prior Publication Data

US 2010/0184505 A1 Jul. 22, 2010

(51) Int. Cl.
 *A63F 9/24* (2006.01)
(52) U.S. Cl. ............... 463/29; 463/25; 463/42; 463/43; 705/67; 902/23
(58) Field of Classification Search ............... 463/25, 463/43, 29, 42; 902/23; 705/67
 See application file for complete search history.

(56) References Cited

U.S. PATENT DOCUMENTS

| 5,354,202 | A | * | 10/1994 | Moncrief et al. ............... 434/69 |
| 6,853,973 | B2 | | 2/2005 | Mathews et al. |
| 7,229,354 | B2 | * | 6/2007 | McNutt et al. ............... 463/29 |
| 2001/0034237 | A1 | * | 10/2001 | Garahi ............... 455/456 |
| 2001/0034268 | A1 | * | 10/2001 | Thomas et al. ............... 463/40 |
| 2002/0077712 | A1 | * | 6/2002 | Safaei et al. ............... 700/93 |
| 2002/0132660 | A1 | * | 9/2002 | Taylor ............... 463/16 |
| 2003/0224852 | A1 | * | 12/2003 | Walker et al. ............... 463/20 |
| 2004/0039695 | A1 | * | 2/2004 | Rowe ............... 705/39 |
| 2007/0293311 | A1 | * | 12/2007 | Walker et al. ............... 463/29 |
| 2008/0305853 | A1 | * | 12/2008 | Roitman ............... 463/25 |

OTHER PUBLICATIONS

International Search Report and Written Opinion dated Dec. 21, 2009, from Application No. PCT/US2009/055934.
"Notice from the European Patent Office dated Oct. 1, 2007 concerning business methods" Official Journal of the European Patent Office, vol. 30, No. 11, Nov. 1, 2007, pp. 592-593, XP007905525 ISSN: 0170-9291.

* cited by examiner

*Primary Examiner* — Zandra Smith
*Assistant Examiner* — Tsz Chiu
(74) *Attorney, Agent, or Firm* — Weaver Austin Villeneuve & Sampson LLP

(57) ABSTRACT

Methods and devices for evaluating risk profiles for potential participants in e-commerce transactions, such as online wager gaming, are described. Player attributes such as identity, age, location, and/or residence may be profiled using data service providers ("DSPs"). The best available DSP(s) may be selected, e.g., according to the jurisdiction. Players may be evaluated according to DSP scores and assigned to levels or "tiers" with predefined attributes, e.g., predefined transaction limits. For example, relatively lower-risk players may be assigned to tiers with relatively higher deposit and withdrawal limits, and vice versa. Efficiencies may be created by differentiating verification steps that are performed during the registration process from those that are performed when a player attempts to make a transaction.

20 Claims, 11 Drawing Sheets

FIG. 6

TIERED VERIFICATION

FIELD OF THE INVENTION

The present invention relates generally to methods and devices for verifying user information in various contexts, including but not limited to the context of wagering games.

BACKGROUND OF THE INVENTION

On-line gaming is subject to the laws of the jurisdiction in which a player is located. A jurisdiction generally coincides with the geographical borders of a province, state and/or country. There are some exceptions, such as those involving tribal lands within a country. Some jurisdictions, including jurisdictions of the United States, prohibit on-line wager gaming. Other jurisdictions allow participation only if a player is of a certain age. Thus, a player's eligibility often depends on the jurisdiction to which the player is subject.

In addition to ensuring a player's eligibility, proprietors of on-line wager gaming systems may also want to evaluate other aspects of a player, such as whether the player has good credit, is in good standing with the law and/or with other gaming proprietors, etc. Although existing methods and devices for verifying user information are generally satisfactory, improved methods and devices would be desirable.

SUMMARY OF THE INVENTION

Methods and devices are provided for evaluating risk profiles for individuals, including but not limited to individuals who seek to participate in online wager gaming. Some such implementations establish limits to transactions that reflect individual risk profiles. Although the methods and devices described herein apply to various types of risk assessment and commercial transactions, many examples will be described herein in the context of online wager gaming. Accordingly, the individuals being evaluated will often be referred to herein as "players" or the like.

In some implementations, player attributes such as identity, age, location, and/or residence may be profiled using information from data service providers ("DSPs"). DSPs may include, e.g., credit reporting agencies, financial institutions such as banks and/or credit card companies, government agencies (or other repositories of publicly available data) and/or other data aggregators. Examples of such DSPs will be described in more detail below. Some implementations of the invention involve risk-based approaches that may leverage a wide variety of DSPs. Some such approaches may choose the best available DSP or DSPs to make the most informed decisions about each player's risk.

Some implementations described herein involve differentiating the verification steps that are performed during the registration process from those that are performed when a player attempts to make a transaction, e.g., when a player attempts to make his or her first cash transaction. In some such implementations, no DSPs are contacted during the initial registration process. The player may be allowed to register if the player's reported age and jurisdiction are acceptable, without reference to DSP data.

Some implementations provided herein involve the evaluation of DSP scores and the assignment of players to levels or "tiers" with predefined attributes, e.g., predefined transaction limits. For example, relatively lower-risk players may be assigned to tiers with relatively higher deposit and withdrawal limits, and vice versa. In some such implementations, a player in the highest-risk tier may require manual verification before the player can play wagering games and/or deposit money.

Some methods of the invention involve the following steps: receiving age data and jurisdiction data regarding a person; determining, according to the age data and jurisdiction data and without reference to data supplied by a data service provider ("DSP"), whether the person is eligible for online wager gaming; and registering the person if the person is determined to be eligible for online wager gaming. Such methods may involve receiving, after the player is registered, an indication that the player desires to initiate an online wager gaming session; verifying whether the person is eligible for online wager gaming, and determining whether to provide the online wager gaming session according to an outcome of the verifying process. The verifying process may occur after receiving the indication and may be made with reference to data obtained from at least one DSP.

Some such methods involve providing the online wager gaming session if it is verified that the person is eligible for online wager gaming. Moreover, if it is verified that the person is eligible for online wager gaming some methods involve categorizing the person as belonging to one of a plurality of tiers, each tier having at least one corresponding monetary transaction limit. Each tier may have at least one monetary transaction limit for funds coming in and at least one monetary transaction limit for funds going out. Each tier may have a temporal monetary transaction limit for each monetary transaction limit.

The categorization process may be performed with reference to data supplied by at least one DSP. The method may involve determining the player's jurisdiction and determining the available DSPs for the player's jurisdiction. The method may involve making a prioritization of the available DSPs and to obtain data from the DSPs according to the prioritization. The method may involve determining whether a stop threshold has been attained and stopping a process of obtaining DSP data if it is determined that a stop threshold has been attained.

These and other methods of the invention may be implemented by various types of hardware, software, firmware, etc. For example, some features of the invention may be implemented, at least in part, by one or more host devices, servers, etc. Some embodiments of the invention are provided as computer programs embodied in machine-readable media. The computer programs may include instructions for controlling one or more devices to perform the methods described herein.

Alternative embodiments of the invention may provide an apparatus comprising at least an interface system and a logic system. The interface system may include at least one network interface. The logic system includes at least one logic device and may be configured to perform the following tasks: receiving, via the interface system, registration data (such as age data and jurisdiction data) regarding a person and determining, according to the registration data whether the person is eligible for online wager gaming. In some such embodiments, the determining process may be performed without reference to data supplied by a DSP.

The logic system may be further configured to perform the following tasks: communicate, via the interface system, with a device used by the person to register the person if the person is determined to be eligible for online wager gaming; receive, after the player is registered and via the interface system, an indication that the player desires to initiate an online wager gaming session; verify, after receiving the indication and with reference to data obtained from at least one DSP, whether the person is eligible for online wager gaming, and determine whether to provide the online wager gaming session according to an outcome of the verifying process. The logic device may be configured to obtain, via the interface system, DSP data from at least one DSP and to perform the verifying process based, at least in part, on the DSP data.

The logic system may be further configured to categorize the person as belonging to one of a plurality of tiers, each tier having at least one corresponding monetary transaction limit. Each tier may have at least one monetary transaction limit for funds coming in and at least one monetary transaction limit for funds going out. In some such embodiments, each tier may have a temporal monetary transaction limit for each monetary transaction limit. The categorization may be made, at least in part, with reference to DSP data.

The logic system may be further configured to determine the player's jurisdiction and to determine the available DSPs for the player's jurisdiction. The logic system may be further configured to make a prioritization of the available DSPs and to obtain data from the DSPs according to the prioritization. The logic system may be further configured to determine whether a stop threshold has been attained and to stop obtaining DSP data if it is determined that a stop threshold has been attained.

Alternative embodiments provide an apparatus comprising an interface system comprising at least one network interface and a logic system comprising at least one logic device. The logic system may be configured to perform the following tasks: receive, via the interface system, registration data regarding a person; determine, according to the registration data and without reference to data supplied by a DSP, whether the person is eligible for online wager gaming; and communicate, via the interface system, an authorization to register the person if the person is determined to be eligible for online wager gaming.

In some such implementations, the registration data may be received from a player and in other implementations the registration data may be received from a third party, such as an online casino or another enterprise. If the registration data are received from a third party, the authorization may be sent to the third party.

The logic system may be further configured to receive, via the interface system, an indication that the player desires to initiate a transaction, e.g., to initiate an online wager gaming session. The indication may, for example, be received after the player is registered. The logic system may be further configured to make a verification, after receiving the indication, whether the person is eligible initiate a transaction, e.g., whether the person is eligible to participate in online wager gaming. The logic system may be further configured to determine whether to authorize the online wager gaming session according to an outcome of the verification.

The logic system may be further configured to obtain, via the interface system, DSP data from at least one DSP. The logic system may be further configured to make the verification based, at least in part, on the DSP data.

The logic system may be further configured to categorize the person as belonging to one of a plurality of tiers, each tier having at least one corresponding monetary transaction limit. In some implementations, each monetary transaction limit may correspond with at least one temporal transaction limit.

BRIEF DESCRIPTION OF THE DRAWINGS

FIG. 6 provides an example of a GUI that may be provided to allow a player to provide additional information according to some implementations.

DETAILED DESCRIPTION

Figure 1A:
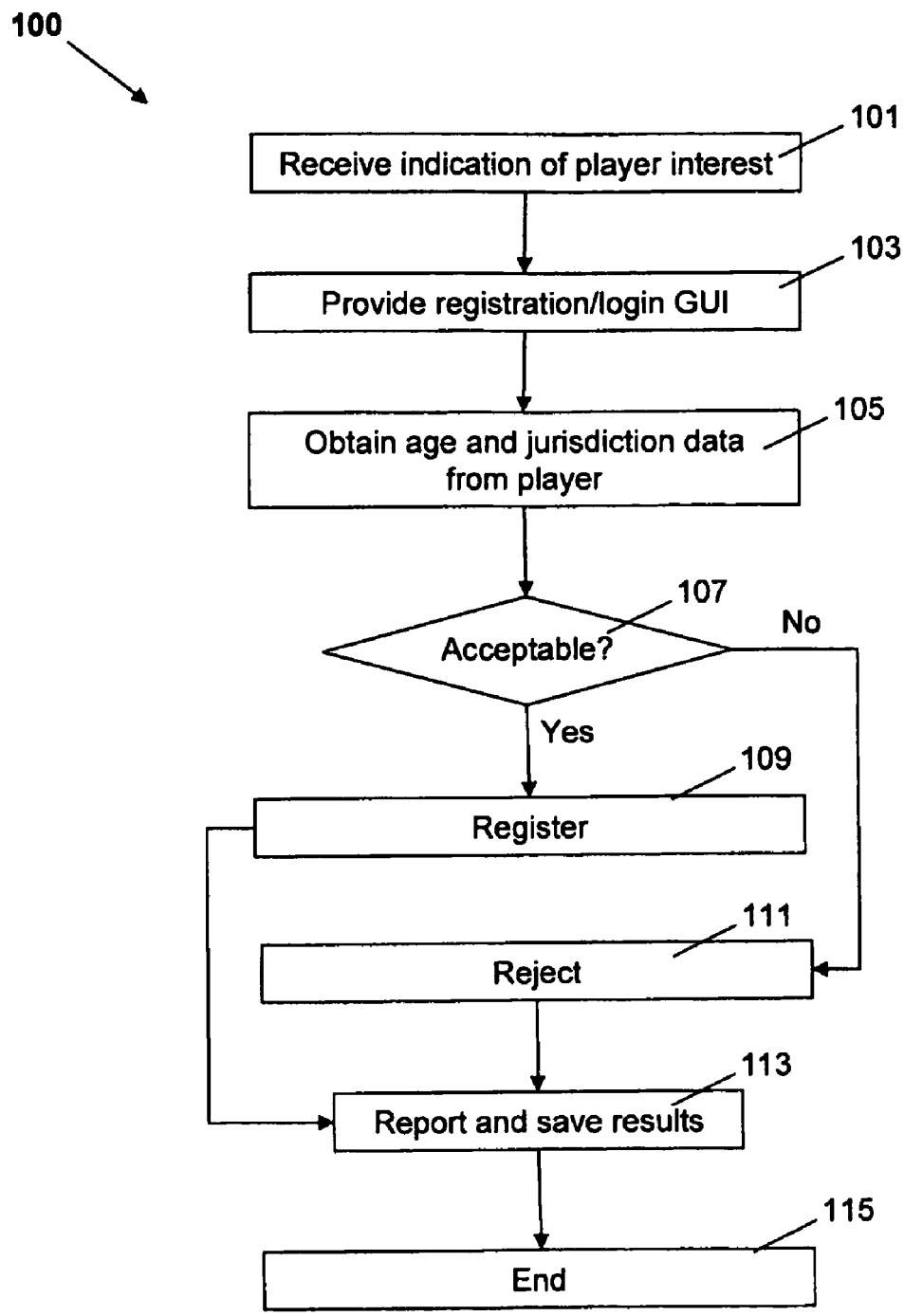
FIG. 1A is flow chart that outlines steps of a registration process according to some implementations.

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. For example, the steps of methods shown and described herein are not necessarily performed in the order indicated. It should also be understood that the methods of the invention may include more or fewer steps than are indicated.

Device functionality may be apportioned by grouping or dividing tasks in any convenient fashion. Therefore, when steps are described herein as being performed by a single device (e.g., by a single server), the steps may alternatively be performed by multiple devices and vice versa.

Various methods and devices will now be described for evaluating risk profiles for individuals. The evaluation may, for example, include an assessment of whether the user is located in a jurisdiction where the user's participation in a particular e-commerce application is legal, whether the user is located in a jurisdiction where the user is subject to other applicable restrictions and/or regulations, whether the player is of legal age for participation, whether the player provided accurate preliminary information, etc. Evaluation can include determining a user's geographical location, residence, credit card fraud risk, age, and identity. The evaluation may involve determining whether the player has provided name and address information that corresponds with a real person (not made up information) and/or determining that the name provided is actually correlated to the residence address.

Player attributes such as identity, age, location, and/or residence may be profiled using data from DSPs. A DSP may be a credit reporting agency, a financial institution, etc. A DSP may be, for example, an on-line application that provides information, such as the GeoPoint™ application provided by Quova™, the VerifyME™ application provided by Aristotle™, one or more of the services provided by CyberSource®, such as the Decision Manager™ and/or the Internet Fraud Screen™ service, the Experian™ E-identity™ service, the Equifax™ Fraud Advisor$^{SM}$ service, the Equifax™ ID Advisor® service, the TransUnion™ Identity Manager Verification$^{SM}$ service, the TransUnion™ ID Analytics® and/or ID Score® service, etc. DSPs may provide other types of information and/or data from which information may be obtained, e.g., bank identification numbers that are part of a credit card number.

Some implementations of the invention involve risk-based approaches that may leverage a wide variety of DSPs. As described in more detail below, the type and quality of DSPs may vary considerably from one jurisdiction to another. Accordingly, some implementations may involve choosing the best available DSP or DSPs to evaluate a player's risk.

In some embodiments, at least some of the steps described herein are performed by a specialized apparatus, which may be referred to herein as a "verification module" a "verification engine" or the like. The verification module may be a single device or a collection of devices. In some such implementations, the verification module may be implemented, at least in part, by a server (or other computing device) that has specialized hardware, software and/or firmware for implementing at least some of the steps described herein. For example, in some implementations the verification module may be implemented (at least in part) by software stored on a machine-readable medium.

According to some implementations, the verification module may create efficiencies as compared to prior art methods with regard to data storage requirements, data network traffic, central processing unit ("CPU") utilization, power consumption and/or other factors. Some such efficiency may be created, at least in part, by differentiating the verification steps that are performed during the registration process from those that are performed when a player attempts to make a transaction, e.g., when a player attempts to make his or her first cash transaction.

Greater efficiency with regard to prior art methods may also be created by establishing and using "stop thresholds" for processing data from DSPs. In some such implementations, once a satisfactory tier is established for a particular category or "check," evaluation for that check is stopped and processing may start for the next check (if any remain to be done). This procedure can reduce the time, the CPU usage, the bandwidth requirements and the cost of unneeded communications with DSPs.

For example, the verification module may create efficiencies by screening out some individuals early in the registration process. In some such implementations, no DSPs are contacted during the initial registration process. The player may be allowed to register if the player's reported age and jurisdiction are acceptable, without reference to DSP data. In some alternative implementations, a player is screened during the registration process by verifying the player's declared date of birth and/or jurisdiction according to DSP data. Underage players and those residing in illegal gambling jurisdictions will be immediately rejected.

If a player is not screened out by a preliminary check, in some implementations the verification module will then evaluate the player's DSP score(s) and assign the players to one or more "tiers." For example, relatively lower-risk players may be assigned to tiers with relatively higher deposit and withdrawal limits, and vice versa. In some such implementations, the highest-risk tier may require manual verification before a player can play wagering games and/or deposit money. Some tiers, may be associated with a particular category of evaluation, e.g., associated with a confidence level for the verification of a player's identity, place of residence, age, location, credit report rating, etc.

The verification module may assess a plurality of such tiers and thereby determine a "final tier" having predefined attributes (e.g., predefined transaction limits) according to a tier mapping process. Some verification modules described herein obtain further efficiencies with regard to the prior art methods (e.g., in terms of CPU utilization) by simplifying the process of assessing tiers to make an overall risk evaluation.

Figure 1B:
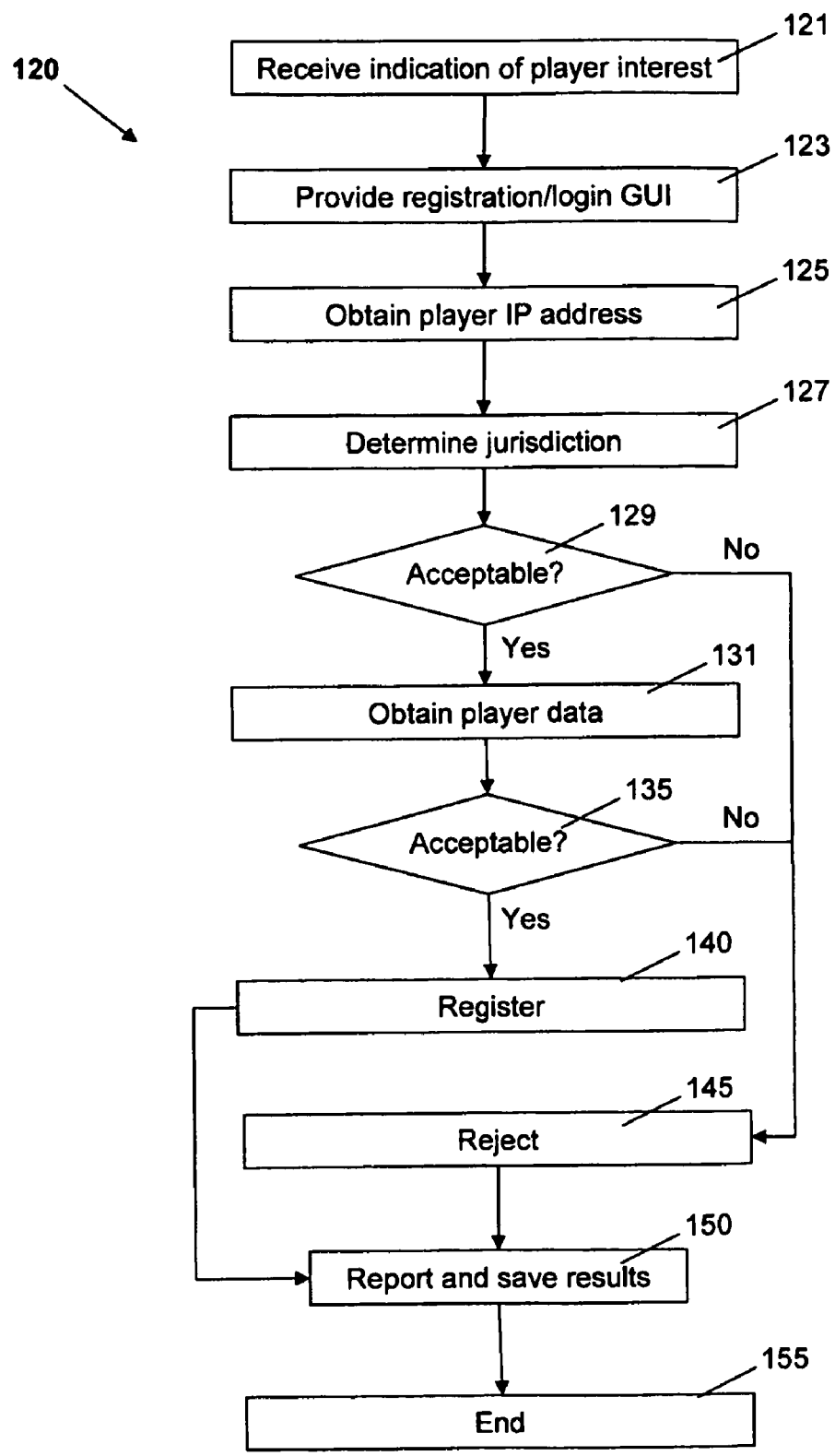
FIG. 1B is flow chart that outlines steps of a registration process according to alternative implementations.

Referring now to FIGS. 1A and 1B, some examples of registration processes will now be described. In some implementations of the invention, the steps of method 100 or method 120 may be performed, at least in part, by a verification module that is embodied by one or more devices of a central system. For example, such steps may be performed by a logic system of one or more servers. The logic system may comprise one or more logic devices such as processors, programmable logic devices, etc. In some implementations, a portion of a device (such as a line card of a network device, a blade of a blade server, etc.) may be configured to perform at least some of these steps, or other steps described herein. Examples of some such devices will be provided below.

It will be appreciated that the steps of processes shown and described herein, including but not limited to methods 100 and 120, are not necessarily performed in the order indicated. For example, in some implementations player data may be obtained (step 131 of method 120) before, or at substantially the same time as, a player IP address is obtained. (Step 115 of method 120.) Moreover, similar implementations of the methods shown or described herein may include more or fewer steps than are indicated. For example, what is depicted as a single step may, in practice, involve sub-steps.

Conversely, some implementations may omit or combine indicated steps. For example, steps 129 and 135 may be part of a single process. Moreover, while much of the description herein involves implementations wherein the verification module is provided by an online casino (or the like), in alternative implementations the verification module is set up as a service for third parties. According to some such implementations, third parties may send user data to the verification module, which may respond with a verification result (e.g., a tier or other classification). Accordingly, such implementations may involve selling verification processing services to other entities (such as casinos or other businesses) that need to evaluate individuals' data, classify risk, etc.

Referring first to FIG. 1A, method 100 does not require that DSP data be obtained during an initial registration process. The player may be allowed to register if the player's reported age and jurisdiction are acceptable. In this example, an indication of player interest is received in step 101. This indication may result, e.g., when a player clicks on a link, selects a particular web site, etc. For example, this indication may be received in response to a player's selection of an online casino's site, a player's selection of a particular online wagering game, etc.

In this example, a graphical user interface ("GUI") is provided to the player to enable the player to log in or register. (Step 103.) For example, the GUI may allow the player to indicate the player's age and the jurisdiction in which the player is currently located, along with other registration information. In some implementations, a GUI may provide a player fields for logging in and a link to a registration GUI that may be used if the player has not yet registered.

In step 105, the player's registration information, including the player's stated age and jurisdiction, are received by the verification module. The player's stated age and jurisdiction are evaluated in step 107, e.g., by reference to a database of jurisdictions that allow online wager gaming and corresponding age requirements. If either the player's stated age or the player's jurisdiction are unacceptable, the player is rejected and not allowed to register. (Step 111.) In the described implementation, this information may be received by the verification module by accessing player data in a database. In other implementations, the verification module may access this data from third parties, e.g., through a public application programming interface.

However, if the player's stated age and jurisdiction are acceptable, the player is allowed to register. (Step 109.) In step 113, the verification module may notify the player of his or her successful registration. For example, the verification module may provide a web page that congratulates the player on registration, provides a player code, requests a userID and/or password, etc. The player may be prompted to provide additional information, e.g., financial information. For implementations wherein the verification module is provided as a service that receives verification requests from third parties, step 113 may involve providing a message to the system requesting the verification.

Preferably, the verification module saves the player's data in one or more data structures for future reference. (Step 113.) In some implementations, records will be maintained even for players who are rejected. It can be useful to maintain a record of a player's attempts to register, of data submitted by the player during such attempts, etc.

Implementations such as method 100 are more efficient and may be more cost effective than previously-deployed methods. The present assignee's WagerWare Casino division has determined that 30% to 40% of registrants never go on to perform an online transaction, e.g., online wager gaming. Running verification at the point of the transaction means only those players who actually want to play are subjected to thorough verification. Moreover, WagerWare Casino previously required a credit/debit card number at the point of registration and then performed a bank identification number ("BIN") check using the first 6 digits of a credit card number. Some implementations described herein do not require a credit/debit card number at the time of registration and/or do not involve performing a BIN check at the time of registration.

Such implementations may create significant efficiencies as compared to prior art methods with regard to data storage requirements, data network traffic, central processing unit ("CPU") utilization, power consumption and/or other factors. Some such efficiency may be created, at least in part, by differentiating the verification steps that are performed during the registration process from those that are performed when a player attempts to make a transaction, e.g., attempts to play an online wagering game. If the player never attempts to make such a transaction, the additional resources and associated costs required for verification are saved. If the player attempts to make such a transaction at a later time, the additional resources and associated costs required for verification are deferred to that later time.

In some alternative implementations, a low or intermediate level of player data verification may be performed before a player is allowed to register. Such implementations involve more player verification than simply accepting the player's reported age and jurisdiction, but may involve less verification than would be necessary for allowing the player to participate in online wager gaming.

In method 120, the verification module checks the jurisdiction in which the player is located and the player's age with reference to DSP data. In this example, an indication of player interest is received in step 121. For example, this indication may be received in response to a player's selection of an online casino's site, a player's selection of a particular online wagering game, etc. A GUI is provided to the player in step 123. In this example, the GUI allows the player to indicate the player's age and the jurisdiction in which the player is currently located, along with other registration information.

In this implementation, the player's jurisdiction is determined according to an Internet Protocol ("IP") address associated with a device that the player is using. However, in some implementations, verification module configurations may be based on a player's stated jurisdiction. Alternative implementations may involve determining a player's location directly, e.g., according to location information provided by a location system such as the Global Positioning System (GPS").

In step 125, the IP address is determined. For example, the system may obtain the IP address from the browser software that the player is using to display and interact with a Web page. The browser software may, for example, communicate via Hypertext Transfer Protocol ("HTTP") to fetch Web pages. HTTP allows browsers to submit information to Web servers as well as fetch Web pages from them.

The player's jurisdiction is determined in step 127. In this example, step 127 may involve several sub-steps. Here, the verification module sends the IP address to a DSP that can determine location (and possibly other) information from the IP address. For example, given an IP address a player is using to access the Internet, Quova's™ GeoPoint™ application can determine the following information: physical location (i.e., continent, country, state, city, and postal or zip code), latitude and longitude, connection type (i.e., dial-up, cable, or DSL), Internet service provider, and a first and second level domain name.

In this example, the verification module receives such information from Quova™, parses and/or translates at least some of this information and queries a database of locations and corresponding jurisdictions. The player's jurisdiction may be determined in response to the query.

The verification module may perform other operations on the data supplied by the DSP, e.g., to evaluate the reliability of such data. For example, GeoPoint™ locates or "maps" the physical location of an IP address. When GeoPoint maps a player's IP address, it is actually mapping the location of the server that an Internet service provider ("ISP") is using to host the player's Internet access. This location is not the same as, and may not be near to, the location of the device being used by the player (which may be referred to herein as the player's "client computer" or otherwise).

Accordingly, there is some level of risk that the player's client computer is not located in the same jurisdiction as the server that the ISP is using to host the player's Internet access. The level of risk may differ according to the ISP and/or the type of Internet connection. Accordingly, in some implementations the verification module may make a distinction between different ISP types and/or connection types.

For example, the verification module may make a distinction between dial-up and non dial-up Internet connections. Non dial-up customers need to use a local ISP. ISPs hosting non dial-up customers use local hosting locations rather than accepting national or international customers at a single hosting location.

Therefore, it is less likely that a mapped IP address for a dial-up connection provides accurate information describing the physical location of a player. ISPs with dial-up customers often maintain a pool of IP addresses that they randomly assign to their customers. Many ISPs with dial-up customers provide 800 numbers to their customers and use servers located throughout their network to host Internet access. If GeoPoint™ maps an IP address to a specific ISP server with dial-up customers, it may be difficult for the verification module to determine the exact location of a player because the IP address may be used by any one of the ISP's customers.

America Online ("AOL") is the largest ISP. Unlike many ISPs, AOL has an international presence. If a player is using a dial-up AOL connection, AOL may assign them an IP address mapped to a server in a different country. For example, an AOL customer located in England could receive an IP address that is mapped to a server in France. Because of AOL's international reach, it is more difficult to determine the physical location of a dial-up AOL customer with confidence.

In step 129, the verification module determines whether the player's jurisdiction and/or the information provided by the DSP is acceptable. In some implementations, step 129 could involve querying the same database of locations and corresponding jurisdictions that is referenced above, or a similar database. For example, if the player is interested in online wager gaming, the verification module may determine that a jurisdiction in which online wager gaming is illegal is an unacceptable jurisdiction. Some jurisdictions may be unacceptable because of legal and/or political considerations.

In some implementations jurisdictions may be unacceptable for other reasons, e.g., because of financial risk and/or the lack of reliable DSP information. In some implementations, the verification module may reject players having dial-up connections and/or players using an ISP that provides international dial-up connections.

However, in other implementations, such players (and/or players located in high-risk jurisdictions) may be registered and subjected to higher levels of scrutiny, additional restrictions, etc. For example, players whose jurisdiction cannot be reliably determined (e.g., because of the connection type and/or ISP) may be provisionally registered and asked to provide additional information before online wager gaming is provided. The types of information and procedures involved may be similar to those discussed below with regard to "second chance" verification.

Alternatively, or additionally, players located in high-risk jurisdictions may be restricted to payment methods that are deemed to be relatively less risk-prone. For example, if the verification module determines that credit card payments from the player's country are relatively low-risk, the verification module may restrict the player to credit card payments. To provide additional risk screening, the verification module may perform a BIN check when players use a credit card to ensure that the credit/debit card was issued from a bank location in the player's country of residence. However, the verification module may determine that credit card payments from another country are relatively higher-risk and may restrict payment to some other method, e.g., using eWalletXpress™, PayPal™, ePassporte, etc.

Figure 2:
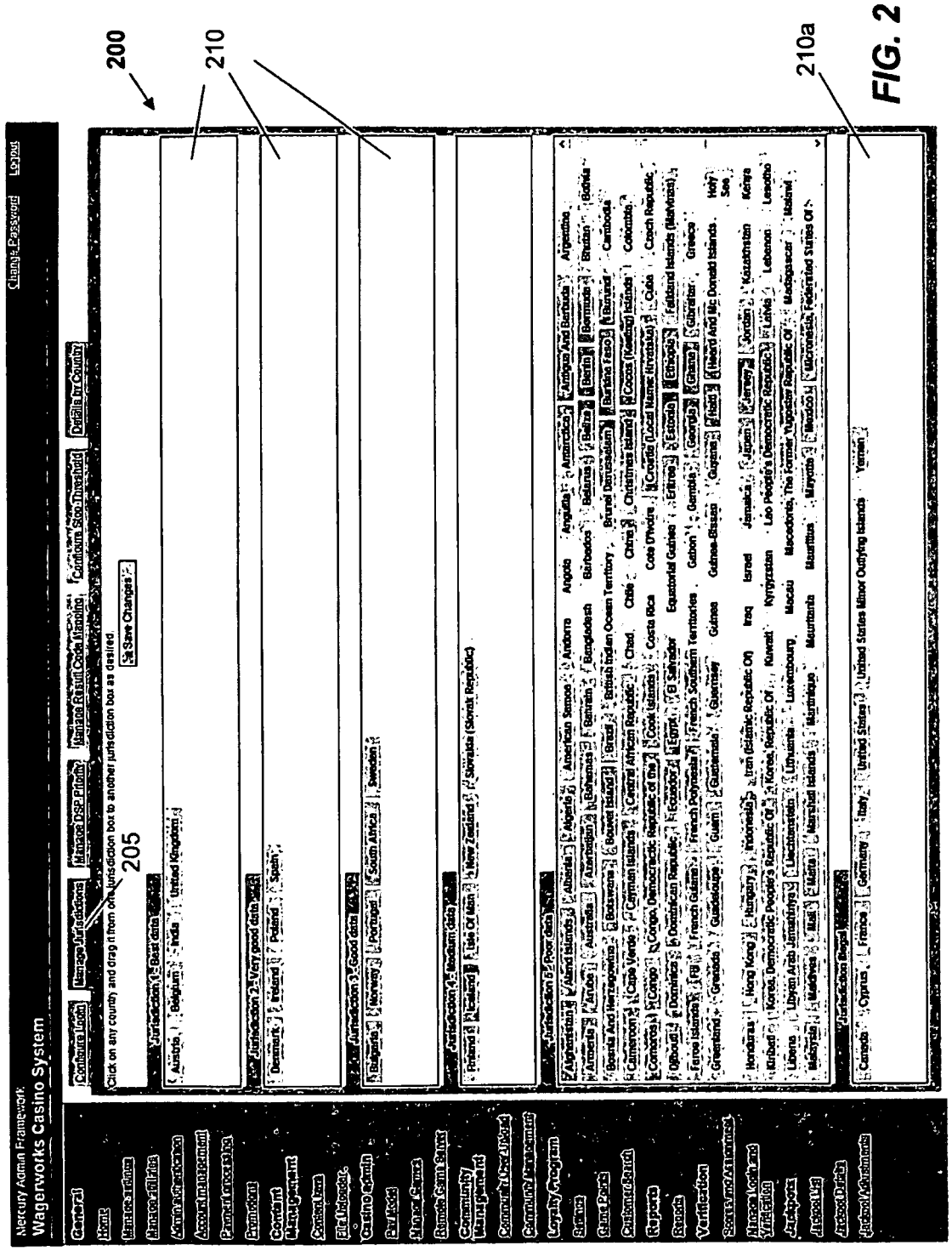
FIG. 2 provides an example of a graphical user interface ("GUI") that may be provided for jurisdiction management according to some implementations.

FIG. 2 provides one example of a graphical user interface ("GUI") that may be used to manage jurisdiction data according to some implementations of the invention. GUI 200 may be displayed, e.g., on a display screen of a device used by a system administrator, an online casino operator, etc. In this example, a user has GUI 200 has been displayed in response to a user having selected "Manage Jurisdictions" tab 205, e.g., by using a mouse, a keyboard, or another such user input device.

GUI 200 allows the user to categorize a jurisdiction according to the quality of data available from DSPs, as well as to indicate jurisdictions wherein online wager gaming is illegal. Each category is indicated in GUI 200 by a corresponding jurisdiction box 210. The user may change the category to which a country is assigned by clicking on the rectangular icon that corresponds with the country, dragging the icon to the jurisdiction box 210 corresponding with the desired new category and releasing the icon.

Each of the jurisdiction boxes 210 may correspond with various other data, requirements and/or actions. For example, some jurisdiction boxes 210 (e.g., those indicating poor DSP data) may correspond with payment method restrictions. Some jurisdiction boxes 210 may correspond with a procedure of performing a BIN check when players from that jurisdiction use a credit card. Some jurisdiction boxes 210 may correspond with manual verification requirements. Jurisdiction boxes 210*a* indicate illegal jurisdictions and correspond with procedures for rejecting a player.

If the verification module determines that the player's jurisdiction is not acceptable, the player is rejected. (Step 145 of FIG. 1B.) An indication is preferably sent to the player, e.g., by providing a Web page from which the player's browser can cause a display to be presented on the player's device. (Step 150.)

However, if the verification module determines that the player's jurisdiction is acceptable, additional player data may be obtained. (Step 131.) Although a wide variety of player information may be obtained, in some implementations a smaller subset of such data is obtained at this stage. For example, player data pertaining to the player's age may be obtained. A threshold determination may be made according to age information provided by the player. For example, if data provided by the player indicates that the player is not old enough for online wager gaming in the player's jurisdiction, the player will be rejected.

However, if the player indicates an acceptable age, this age may be verified (or at least substantiated) by data obtained from one or more DSPs. DSPs that may provide data regarding a player's age, residence and identity include, but are not limited to, the Experian™ E-identity™ service and the VerifyME™ application provided by Aristotle™.

If the VerifyME™ service is used, the verification module may send the following information to VerifyME™: first name, last name, date of birth, postal code, country, and government ID. The type and format of government ID may depend on the country where the player resides and may comprise, for example, a driver's license, a passport, etc. VerifyME™ returns a result code indicating what portion of the information provided by the player matches the information describing the player in publicly available records.

There are more than 400 different result codes that may be returned from VerifyME™. When VerifyME™ receives player data it searches its records for combinations of matching data. VerifyME™ may be able to match all of the player's data, or may only be able to match portions of the data. Each result code may represent a unique combination of matching player data.

Each result code may indicate an age check score. The highest scores are assigned to result codes indicating that VerifyME™ can match a player's first name, last name, date of birth, and government ID data.

If the verification module uses the Experian™ E-identity™ service for an age, residence and/or identity check, the verification module may send the following information to the E-identity™ service: forename, surname, title (such as Mr. or Mrs.), house name or house number, postal or zip code, address or street address, driver's license number, passport number, country and city/town. If applicable, other forms of identification (e.g., the player's national insurance number) may be provided. When E-identity™ receives a request from the verification module, E-identity™ compares the player data to several data sources, such as credit bureau identity information, voter rolls, telephone directories, etc. Based on the results of the comparison, E-identity™ attempts to determine whether the information provided by the player at registration is accurate. E-identity™ will return at least one result code indicating the relative accuracy of the information supplied by the player.

E-identity™ result codes may indicate two types of results. One may be a numeric code that indicates player data violates a high risk policy rule. The numeric code may range, e.g., from 0 to 19. E-identity™ may use various risk policy rules that identify likely cases of fraud. Risk policy rules detect suspicious patterns in player information, such as no trace of supplied address, potential "developed" identity, date of birth mismatch, an invalid BIN number or a credit card that was issued overseas, etc.

The other type of code provided by E-identity™ may be a relative risk code indicating a level of authentication that may range, e.g., from 20 to 90. Result codes of 20 and 30 indicate likely fraud and/or no evidence to associate the player with the address provided. Therefore, these result codes indicate that the player is not authenticated.

If E-identity™ is able to successfully analyze player information and no risk policy rules are triggered, it returns a result code between 40 and 90, indicating the relative risk associated with the player. A result code of 40 indicates a low level of authentication, result codes of 50 and 60 indicate medium levels of authentication and high levels of authentication range from 70 to 90.

In some implementations, the verification module may determine whether the player's age is acceptable (step 135) by mapping a DSP result code (e.g., a VerifyME™ result code or an E-identity™ result code) to 1 of 3 categories. The first category may correspond to DSP result codes that the verification module determines to be acceptable. The second category may correspond to DSP result codes that the verification module determines not to be acceptable. The third category may correspond to DSP result codes that the verification module determines to fall into an intermediate category and/or to require further information before the player's age can be verified with an acceptable level of confidence.

In alternative implementations, the verification module may translate result codes (and/or other data) returned from the DSP into an internally defined result code, into more than 3 categories, one of 2 categories, etc. In some such implementations, the verification module may a translate data received from a DSP into a rank, e.g., 1 to 5, −1 to 5, 1 to 10, etc. Such ranks may sometimes be referred to herein as "tiers" or the like. The tier may correspond with a single criterion, e.g., age.

Figure 3:
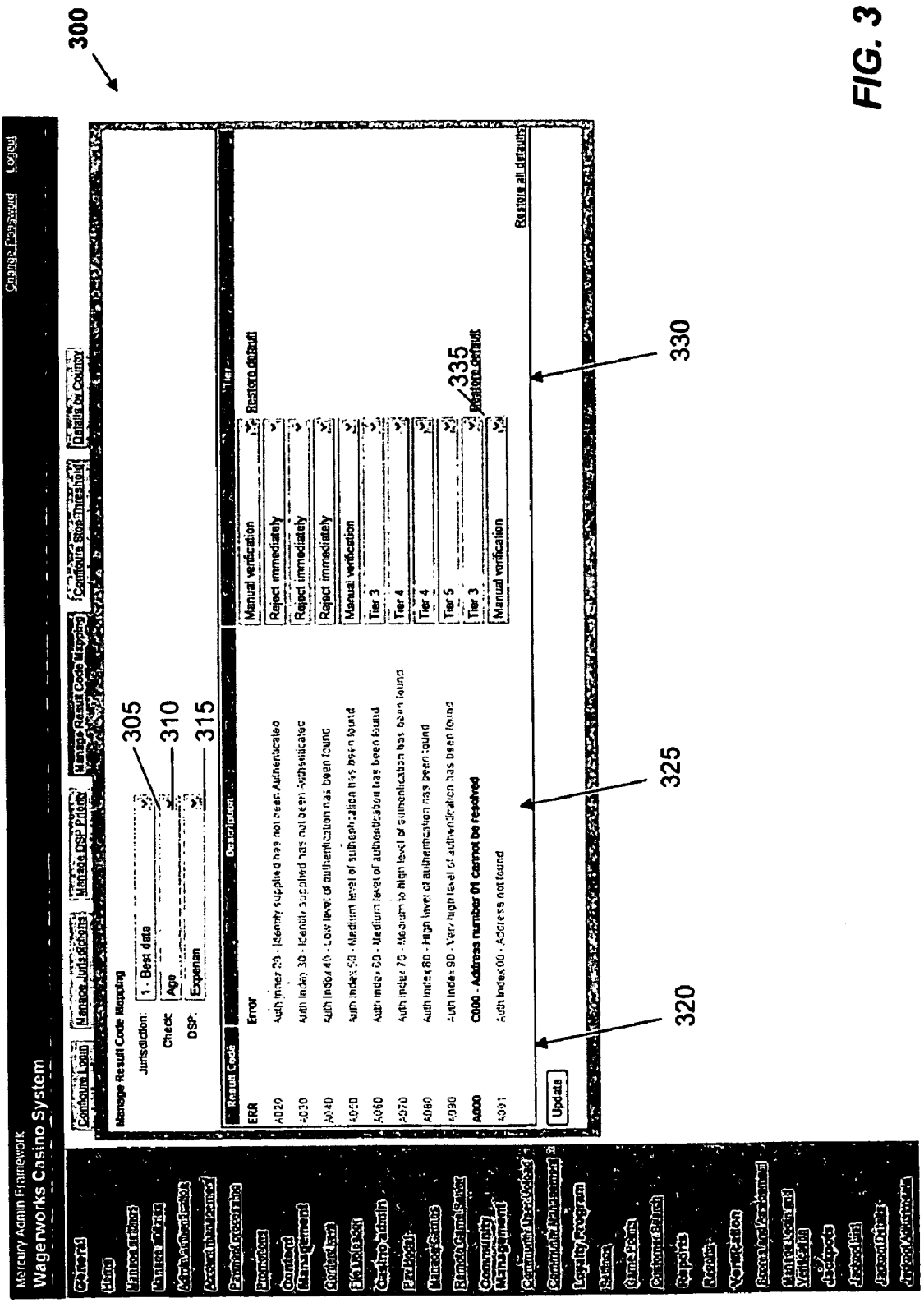
FIG. 3 provides an example of a GUI that may be provided for mapping DSP results to tiers and/or actions according to some implementations.

FIG. 3. illustrates GUI 300, which provides an example of how result codes may be mapped and managed according to some implementations of the invention. In this example, GUI 300 pertains to situations in which the verification module is performing an age check (see area 310) based on Experian™ data (see area 315) from a jurisdiction having the highest quality of available DSP data (see area 305). Areas 305, 310 and 315 are configurable, allowing a user to, e.g., specify tiers and/or actions corresponding with data from other DSPs. As with other implementations described herein, the particular values set forth in FIG. 3, the layout of GUI 300, etc., are merely illustrative examples; many other possible values, tiers, layouts, etc., are within the scope of the invention.

In this example, Experian™ result codes are indicated in field 320. Corresponding result code descriptions are listed in field 325. In this example, tier 5 corresponds with Experian™ result code A090, which indicates that Experian™ determined the highest level of authentication. Tier 4 corresponds with Experian™ result codes A070 and A080. Experian™ result codes A020, A030 or A040 would result in a player being rejected immediately. However, Experian™ result codes ERR, A001 and A050 would trigger a manual verification process.

Here, the corresponding tiers and actions of field 330 may be configured by the user. For example, the user may interact with widget 335, which may be a combo box or a drop-down list in this example, in order to select a different tier or action to correspond with Experian™ result code A000. The user may decide, e.g., to make Experian™ result code A000 trigger a manual verification process. The user may also decide to change this tier to a default value by clicking on "restore default" for this value or by clicking on "Restore all defaults."

In some alternative implementations, the tier and/or result code may correspond with more than one criterion. Such implementations may be advantageous if the data received from a DSP also indicates an assessment of more than one criterion. In some such implementations, the data from a DSP may indicate a combined evaluation of both age and residence, identity and residence, etc.

For example, the result code received from VerifyME™ or E-identity™ may represent a combined assessment of a player's identity and residence data or a combined assessment of a player's age and residence data. Therefore, the verification module may make a single communication to a DSP and may receive a single result code indicating a combined assessment of a player's age and residence data.

In some implementations, the verification module may apply a rule set to such combined data to differentiate the different data components, e.g., to differentiate age data from residence data, to differentiate identity data from residence data, etc. According to some such implementations, the verification module may determine different tiers based upon the same result code. For example, if VerifyME™ were to return a result code of 85 and if the verification module were assigning result codes to tiers 0 through 5, the verification module may determine a score of 5 for the residence check and a score of 3 for the age check.

However, in other implementations the verification module may assign the same score for each category. This may depend on the DSP from which data are being obtained. For example, the result code received from E-identity™ may represent a combined assessment of a player's age and residence data. If the verification module were assigning result codes to tiers 1 through 10, the verification module may map a result code of 90 from E-identity™ to the may a score of 10 for both the age check and the residence check.

If the player is determined to be below an acceptable age, the player may be rejected. (Step 145.) If the player is determined to be at or above an acceptable age, the player may be registered. (Step 140.)

In step 150, the verification module may notify the player of his or her successful registration. For example, the verification module may provide a web page that congratulates the player on registration, provides a player code, requests a userID and/or password, etc. The player may be prompted to provide additional information, e.g., financial information. Preferably, the verification module saves the player's data, DSP data, tier data, etc., in one or more data structures for future reference. For implementations wherein the verification module is provided as a service that receives verification requests from third parties, step 150 may involve providing a message to the system requesting the verification.

The foregoing description provides some examples of initial screening and registration processes that may be provided according to various implementations of the invention. Such implementations provide a streamlined risk-profiling tool that may achieve higher registration rates, as compared to prior art methods, while more accurately gauging player risk. Efficiencies may be obtained over prior art methods with regard to the amount of memory, CPU usage, bandwidth usage, money and/or other resources required for either registering or screening out a player. Additional player data may be obtained subsequently, e.g., if the player seeks to play a wagering game, seeks to make a financial transaction, etc.

Some examples of subsequent processes will now be described with reference to FIG. 4. In this example, an indication that a player desires to play an online wagering game and/or make a transaction is received in step 405. Step 405 may involve, e.g., a communication from a device used by the player indicating that the player has provided input to a GUI, a widget, etc., provided by an online casino. In this example, the player's age and jurisdiction have recently been established and determined to be satisfactory, e.g., according to a screening procedure such as that described above.

In step 410, the available and/or preferred DSP(s) for the player's jurisdiction are determined. If multiple DSPs are available in the jurisdiction, they may be evaluated according to predetermined prioritization rules (optional step 412). The verification engine may communicate with DSPs sequentially based on such predetermined prioritization rules, which may be based, e.g., on the player's jurisdiction and each DSP's data coverage and/or data quality.

If no DSPs are found for a jurisdiction, the verification engine may assign a default result code that reflects the compliance policies for the jurisdiction. In some implementations, a default DSP could be applied for each type of check. A default DSP may, for example, have a single result code that can be mapped to a tier. Different tier mappings may potentially be provided for each jurisdiction.

The tier value specified for a default DSP may reflect a business objective for cases in which no successful response was received from any DSP within the player's jurisdiction, where there are no valid DSPs in the player's jurisdiction, etc. For example, the tier may be "tier 0" or the like, wherein a player may be registered but is not allowed to make a transaction, play a wagering game, etc., because no substantive verification has occurred. However, in alternative implementations, a default DSP may correspond with a different tier, e.g., a higher tier. Using default DSPs provides a way to support registration even through the verification module may not have access to information from a DSP in, or relating to, a player's jurisdiction.

Figure 5:
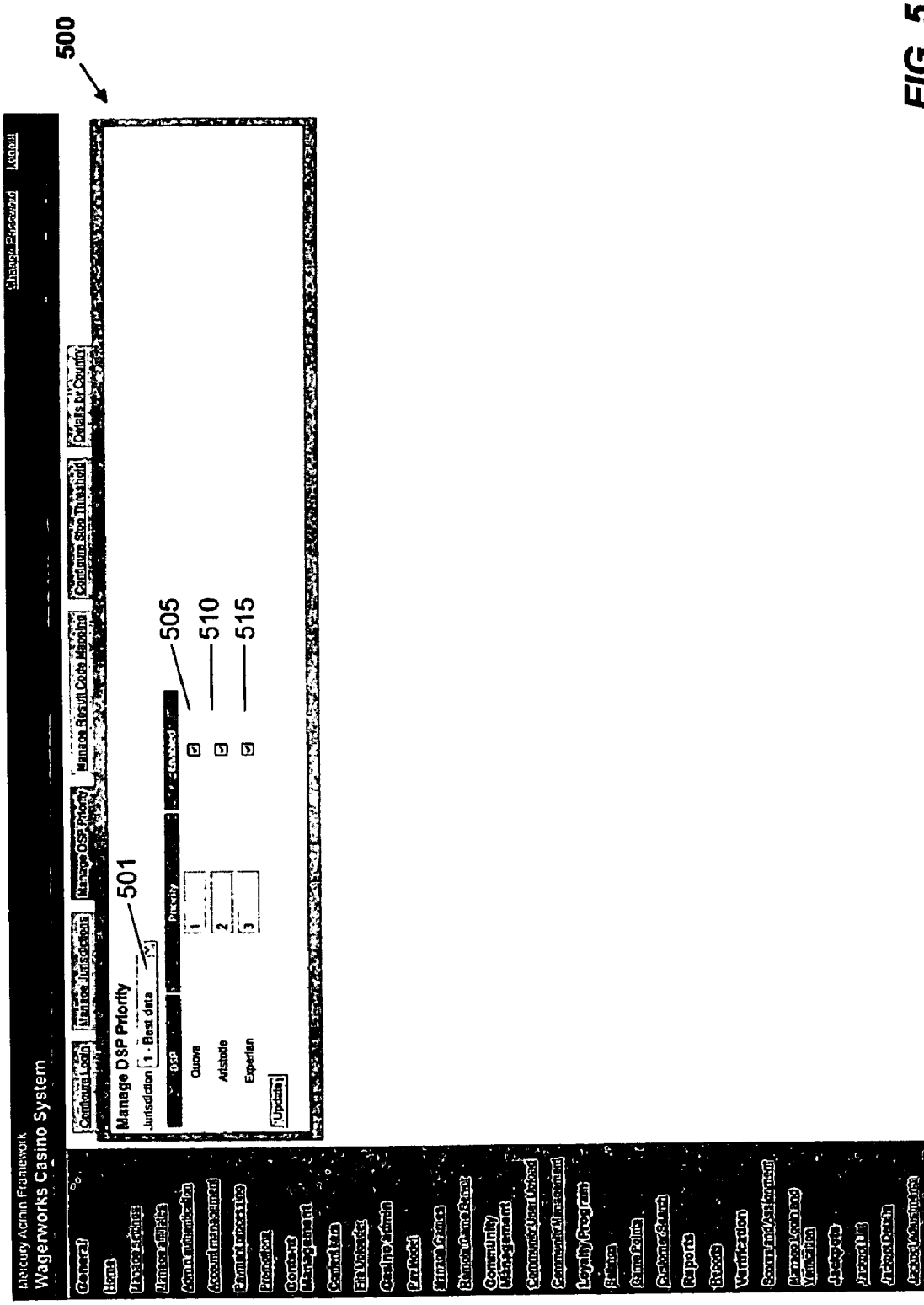
FIG. 5 provides an example of a GUI that may be provided for managing DSP priority according to some implementations.

As shown in FIG. 5, for example, the verification engine may be configured to enable and prioritize multiple DSPs for a selected category of jurisdiction. Here, "best data" jurisdiction type 1 (see area 501) has at least 3 available DSPs: Quova™, Aristotle™ and Experian™. (See areas 505, 510 and 515, respectively.) In this example, Quova™ has been assigned the highest priority, Aristotle™ has been assigned the $2^{nd}$-highest priority and Experian™ has been assigned the lowest priority. All are currently enabled. An operator may interact with GUI 500 to change the priorities, enable or disable DSPs, etc.

If multiple DSPs are available in the jurisdiction, they may be evaluated according to a predetermined order of priority. Before sending a communication to a DSP, the verification engine may make a determination as to whether the player has provided the player data required by the DSP for its evaluation. In some such implementations, if a player has not provided player data for a DSP that has been assigned the highest priority, the verification engine may determine whether the player has provided player data for a lower-priority DSP. The player may be prompted for additional data, if necessary, possibly according to a manual verification process. If the player does not or cannot provide adequate data, the player may be rejected.

In some alternative implementations, if a player has not provided the data needed for a specific DSP, the DSP will not be contacted and the verification module will move on to the next DSP (if any). If the list of DSPs is exhausted and the player does not have sufficient data for any of them, then the player will be given the default tier.

Assuming that the player has provided adequate data for DSP evaluation, DSP data are obtained. (See step 415 of FIG. 4.) In step 420, the verification engine maps the DSP data to one or more tiers and/or actions. For example, the verification engine may reference a data structure that indicates DSP result codes and corresponding tiers and/or actions, e.g., as described above with reference to FIGS. 1 and 3. However, as noted elsewhere herein, the same DSP data may be used for more than one "check" or verification category. Accordingly, step 420 may involve mapping DSP data to more than one tier and/or action.

In this implementation, if the verification engine determines that the tier is not an acceptable tier, in this example it is then determined whether manual verification is required. (Step 440.) For example, if the verification engine is using the type of result code mapping indicated in FIG. 3, the verification engine may determine whether a DSP result code corresponds with "manual verification." If the verification engine determines that a DSP result code indicates rejection, the player will be rejected. (Step 455.) Some implementations do not involve a mechanism for "short circuiting" the verification flow prior to its completion, other than when a player is rejected. Moreover, in some implementations steps 425 and 440 may be performed as part of a single process.

In step 430, the verification engine will determine whether to obtain additional DSP data, which may comprise data from another DSP or additional data from the same DSP. For example, step 430 may involve evaluating whether sufficient DSP data have been obtained for all of a predetermined number of checks that the verification engine will perform. In some implementations, these checks may include an age check, a residence check, an identity check and a location check. Additional checks, such as credit scoring, determination of whether a player is on a list of excluded players, etc., may be performed.

In some implementations, step 430 may involve a determination of whether a "stop threshold" has been attained for a particular check. For example, if the verification engine determines in step 425 that an acceptable tier has been established for a particular check, the verification engine may determine that no further evaluation for that check will be made, whether or not all DSP data have been obtained for all available DSPs that could provide data for that check. In some such implementations, the stop threshold for all checks needs to be met in order for the verification engine to stop calling additional DSPs. Such procedures can reduce the time, CPU usage, network bandwidth requirements, storage requirements and the cost of unnecessary data requests to DSPs. Processing may start for the next check, if any remain to be performed.

According to some implementations, a stop tier is defined per category of verification check. The stop tier may, for example, be based (at least in part) on the quality of data available for the jurisdiction. For example, a relatively high stop tier (e.g., tier 4 or tier 5) may be established for jurisdictions in which the highest quality of DSP data is available.

If it is determined in step 430 that additional DSPs data will be obtained, the process continues to step 415. However, if it is determined in step 430 that all required checks have been performed and that no further DSPs data will be obtained, the verification module applies scoring rules to determine a final tier (step 435) and determines whether the final tier is acceptable. (Step 450.) In some implementations, steps 435 and 450 may be combined in a single operation.

Moreover, in some implementations, a final tier may be a manual verification tier. Accordingly, the manual verification process may follow step 450 in alternative implementations. Some such implementations may allow a player to establish a higher final tier value, higher transaction limits, etc., than the player could obtain through a purely automated process. For example, a player may be assigned to a maximum of tier 5 through an automated process, but may be able to achieve a tier 6 via a manual process (e.g., by providing faxed documentation of required data).

Some examples of step 435 will now be described. For each verification check, the verification module may determine whether data from more than one DSP were used for the verification check. If so, the higher (or highest) tier received for that verification check would be selected. For example, suppose data from 2 DSPs were used for the age check. Suppose further that data from one DSP were mapped to a tier of 3 and data from the other DSP were mapped to a tier of 4. The higher tier of 4 would be selected for the age check.

After a tier has been determined for each check, in some implementations the final tier will be set to the value of the lowest tier for any check. For example, suppose the age check tier were 4, the residence check tier were 3, the identity check tier were 4 and the location check tier were 5. The final tier would be set to 3, the lowest value for any check.

In some implementations, a negative tier may be assigned to a check. For example, the tiers may range from −1 to 6. If one of the checks indicates a −1 tier, the final tier will be set to the value of the lowest positive tier value for any other check, minus 1. For example, suppose the age check tier were 4, the residence check tier were −1, the identity check tier were 3 and the location check tier were 5. The final tier would be set to 2, the value of the lowest positive tier value for any other check (3, for the identity check) minus 1. In some such implementations, more than one negative score may be applied to reach the final tier value. For example, suppose the location tier=5, the age tier=−1, the residence tier=−1 and the identity tier=5. The final tier is set to 3 in this example (5−1−1=3).

In some embodiments, the lowest final tier value may be set to zero even if more than one of the checks has a negative value. For example, suppose the location tier, the age tier, the residence tier and the identity tier were all −1. The final tier in such embodiments would be zero, even though the cumulative score would otherwise be −4.

If it is determined that the player's final tier is acceptable, the player's funds and activities will be managed accordingly. (Step 460.) In one example, tiers are ranked and mapped to player transactional limits as described in the following paragraphs.

Tier 0 may represent the highest risk category of players that are not rejected. In some embodiments, a tier 0 player cannot play wagering games for money, but has the option of providing additional information for what is sometimes referred to herein as "Second Chance" verification or the like. In some implementations, the additional information may be provided electronically, e.g., via .pdf file or via facsimile. The additional information may include, e.g., passport data, bank account, driver's license data, etc.

Figure 6:
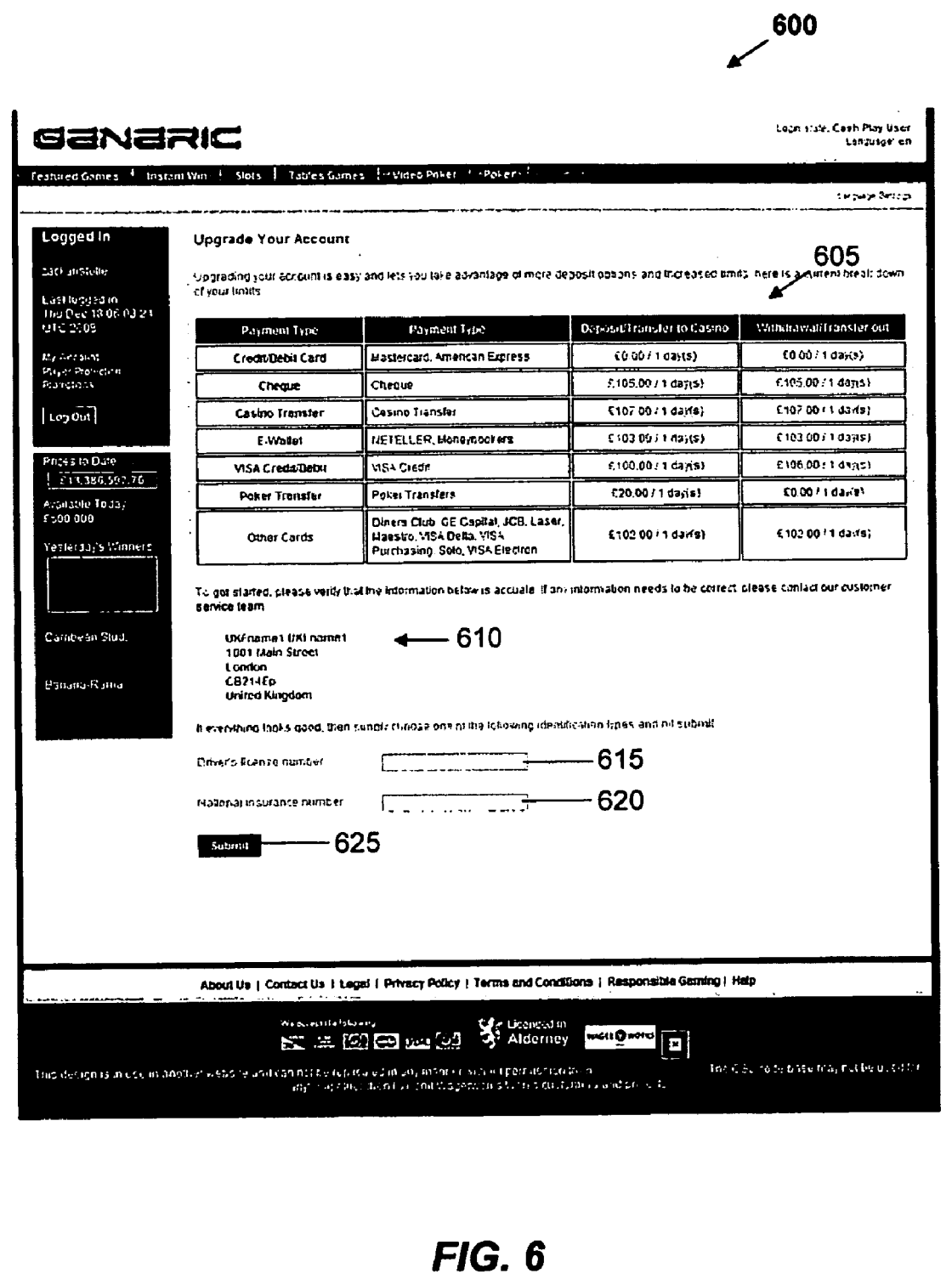

One example of a GUI that may be presented to a player for obtaining such additional information is provided in FIG. 6. GUI 600 includes area 605, which indicates the player's current deposit/transfer and withdrawal limits for various payment types. The player's name and address of record are presented in area 610, which also includes a prompt for the player to reply with any required changes. The player is also prompted to provide either (a) a driver's license number in field 615 or (b) a national insurance number in field 620, then click on "Submit" button 625.

However, driver's license numbers and national insurance numbers are merely examples of "second chance" data that may be obtained from a player. Some implementations provide a list of second chance data types that may be requested from a player and/or displayed in a GUI such as GUI 600. In some implementations, the data types involve may depend, at least in part, on the player's country of registration. Such data may be configurable by an administrator.

In this example, players who are determined to be in tiers 1 through 5 are allowed to play wagering games for money. Tiers 1 through 5 are characterized by increasing maximum transaction values, where 5 is the least restricted tier having the highest maximum transaction values. Players in tiers 1 through 5 also qualify for Second Chance verification.

Here, tier 6 has yet higher maximum transaction values. In this example, the maximum transaction values of tier 6 require manual approval for anti-money laundering verification. Such manual verification may involve, for example, submission of a photocopy of a player's passport to a casino administrator, e.g., via facsimile. Accordingly, in this example a player cannot qualify for tier 6 status through automated verification.

Figure 7:
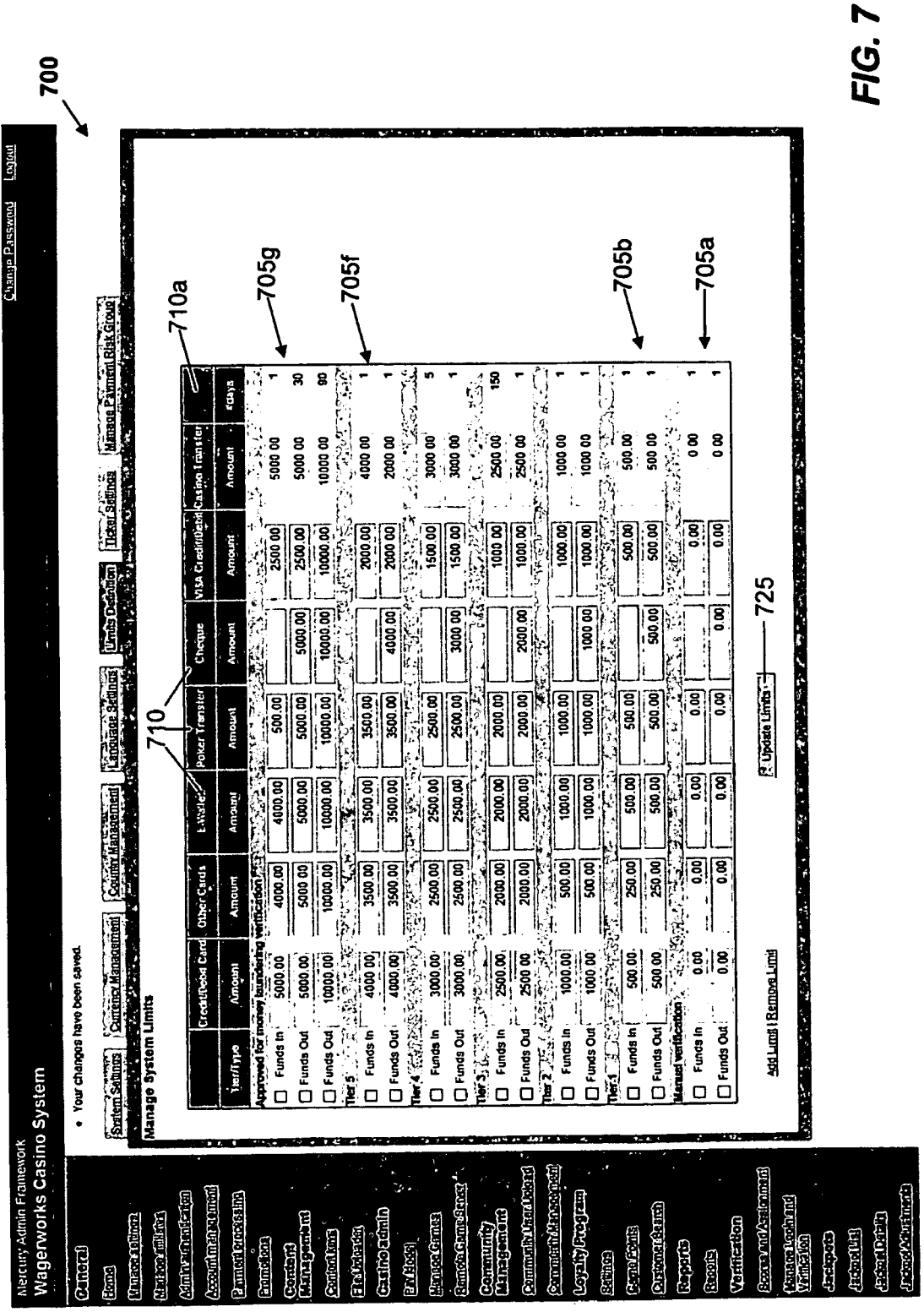
FIG. 7 provides an example of a GUI that may be provided for managing system limits according to some implementations.

FIG. 7 indicates one example of a GUI that may be used by, e.g., a casino system administrator for managing transaction limits associated with various tiers. The monetary units in this example are pounds sterling, but could be set to any convenient unit, such as Euros, American dollars, etc. An authorized user may interact with GUI 700 by, e.g., revising the indicated monetary transaction limit values and then clicking on "Update Limits" button 725. For example, operators may configure deposit and withdrawal limits for each tier by payment type. Accordingly, such features allow operators to restrict the payment options available to players who present the greatest risk of fraud, charge-backs, collusion, identity theft, etc.

In this example, GUI 700 includes a horizontal area 705 for each corresponding tier. Area 705*a*, for example, corresponds with a manual verification tier. Columns 710 indicate various payment options and monetary transaction limits corresponding to each payment option. The monetary transaction limits for the manual verification tier (which may correspond with "tier zero" in some implementations) are set to zero in this example. The monetary transaction limits for tier 1, indicated in area 705*b*, are set to £ 500 for both funds in (deposits) and funds out for most payment options. The monetary transaction limits for "other cards" payment option is set to a lower level for all tiers in this example.

Here, the monetary transaction limits are set higher for higher tier levels. For example, the limits for funds in and funds out for a "Tier 5" player range from £ 2,000 to £ 4,000. (See area 705*f*.) Area 705*g* indicates monetary transaction limits, time periods, etc., for the highest tier established for this implementation. In this example, these maximum transaction values require manual approval for anti-money laundering verification. Such manual verification may involve, e.g., submission of documentation to a casino administrator via facsimile, evaluation of such documentation by one or more casino administrators, the establishment of a physical, paper file for the player, etc.

Column 710a indicates temporal transaction limits corresponding to each of the monetary transaction limits. Here, the temporal transaction limits are expressed in days, but any convenient unit of time could be used. Accordingly, column 710a indicates the minimum number of days that must elapse before the corresponding monetary transaction limits can be exceeded. For example, column 710a and area 705g indicate that a maximum of £ 10,000 can be transferred out of a "tier 6" player's account during a 90-day period.

According to some implementations, when a player attempts a transaction, the system adds the value of the attempted transaction to the sum of all previous successful transactions within the time period specified to determine whether a limit would be exceeded by the attempted transaction. For example, if there is a 1-day limit, the system may sum all similar transactions within a 24-hour period of the time the transaction is attempted, plus the amount of the attempted transaction, to determine whether a limit would be exceeded.

Multiple limits may be established for different types of transactions during the same time period e.g., for total wagers, for maximum bets, for maximum deposits or withdrawals, etc. Alternatively, or additionally, different limits may be established for different time periods. For example, for a particular type of transaction or activity (e.g., for withdrawals), there may be a limit of 100 monetary units per 24-hour period and a limit of 500 monetary units per 72-hour period. When the player attempts the transaction, comparable transactions within the past 72 hours would have to be less than 500 monetary units and comparable transactions within in the last 24 hours would have to be less than 100 monetary units.

Figure 4:
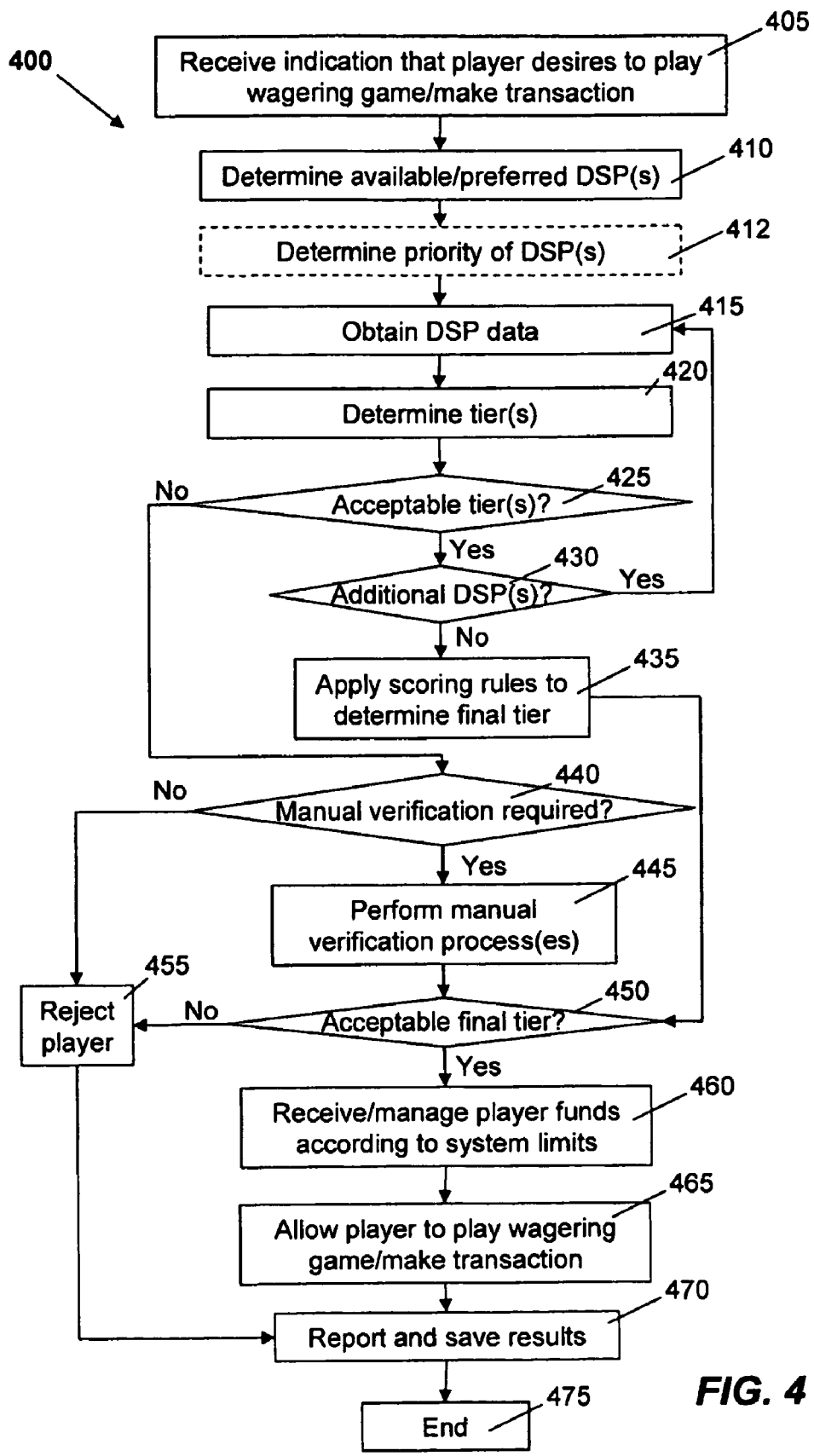
FIG. 4 is flow chart that outlines steps of various implementations.

In the example shown in FIG. 4, player funds may be received in step 460. It will be appreciated that that player funds may also be received at other times, e.g., after a player has begun a session of wagering games.

Figure 8:
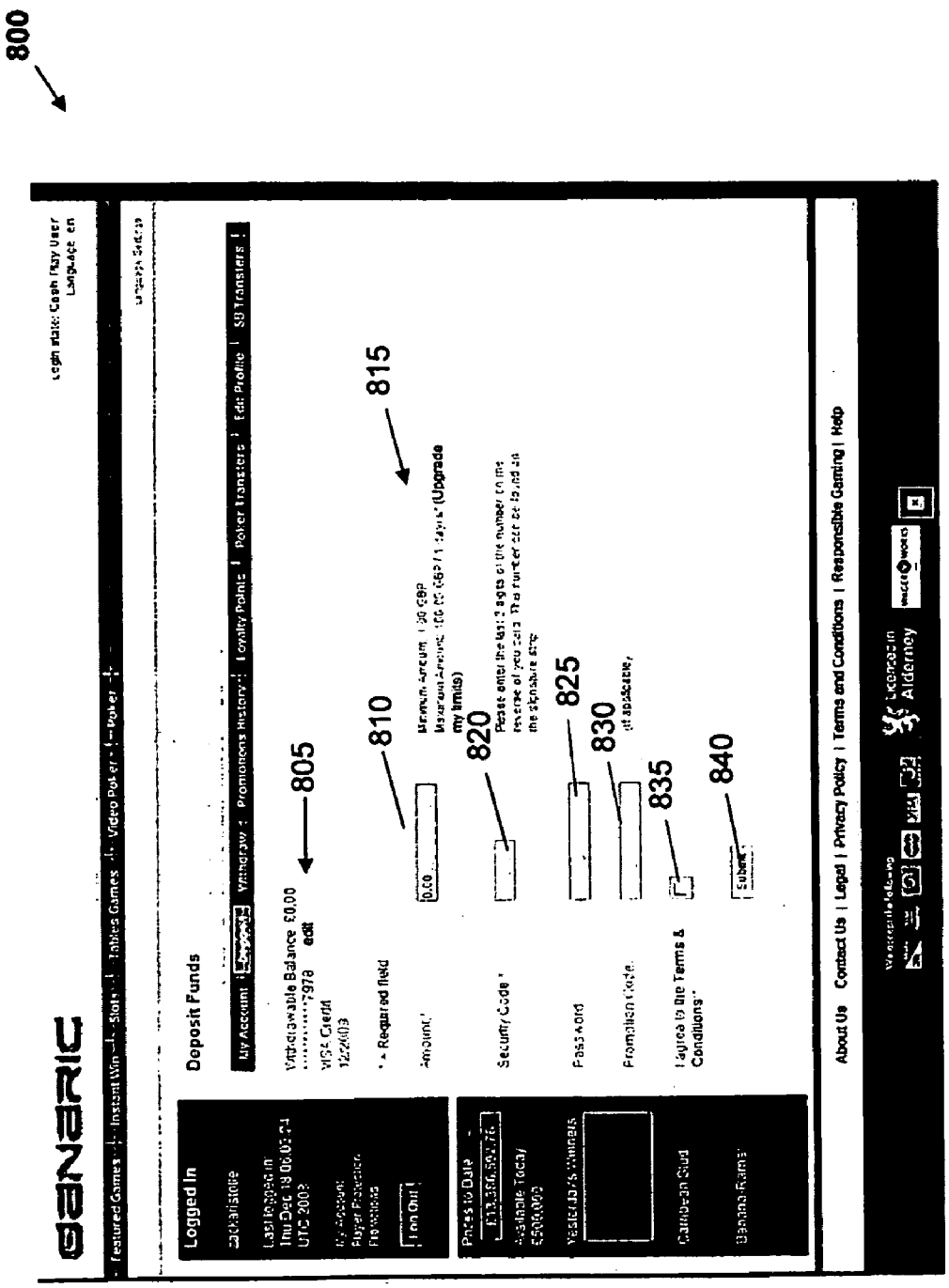
FIG. 8 provides an example of a GUI that may be provided for depositing funds according to some implementations.

FIG. 8 indicates one example of a GUI that may be presented to a player for the purpose of allowing the player to deposit funds in his or her account. GUI 800 indicates the player's selected (or default) payment option, which is a particular VISA™ card account in this example, in area 805. The player may edit area 805 to select another payment option, if so desired. The player may indicate a deposit amount in area 810, subject to the limits noted in area 815. The limits preferably correspond to the temporal and monetary transaction limits for the player's tier. A player desiring higher monetary transaction limits may click on the "Upgrade my limits" link. The player would be provided with a GUI for submitting additional information for determining whether the player can be upgraded to a higher tier.

Here, the player may indicate a credit card security number in area 820 and a promotion code, if applicable, in area 830. In some implementations, the player may need to click and at least scroll through the Terms and Conditions (that will be displayed by clicking on button 835) before being allowed to submit the deposit information (by clicking on button 840).

Returning again to FIG. 4, the player may be allowed to play wagering games or make other transactions in step 465. Preferably, the player's data are stored in a data structure for future reference. (Step 470.)

Figure 9:
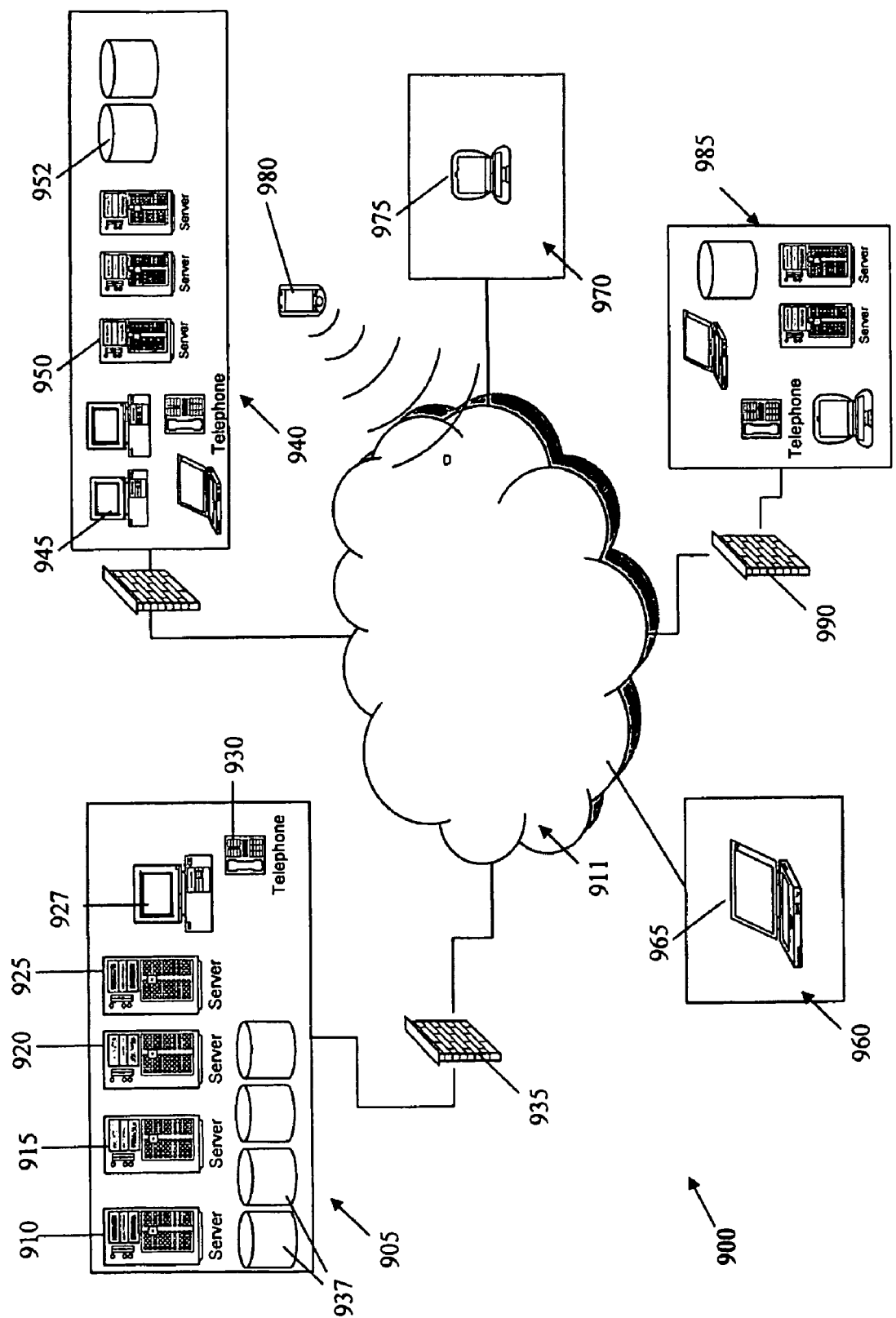
FIG. 9 illustrates a simplified network that may be used to provide various aspects of the invention

A simplified depiction of a network that may be used to provide some implementations of the invention is shown in FIG. 9. It will be appreciated that other types of networks involving different devices, more or fewer devices, etc., may be used to implement the present invention. In this example, enterprise 905 is a game provider that provides Internet wagering games, but is not a gaming establishment (such as a casino or the like) that provides on-site wagering games. However, in alternative implementations, enterprise 905 may be associated with such a gaming establishment, but may or may not provide online wagering games.

Moreover, in alternative implementations wherein verification services are provided for third parties, enterprise 905 may or may not involve gaming at all. According to some such implementations, the external systems of third parties may send user data to the enterprise 905, which may respond with a verification result (e.g., a tier or other classification). Accordingly, such implementations may involve selling verification processing services to other entities (such as casinos or other businesses) that need to evaluate individuals' data, classify risk, etc.

However, in this example, enterprise 905 provides Internet wagering games via one or more of servers 910, 915, 920 and 925. In some implementations, servers 910, 915, 920 and 925 may be configured for specialized tasks. For example, server 910 may be primarily configured to provide games, server 915 may be primarily configured to provide authentication/verification functions, server 920 may be primarily configured to provide cheating detection services and related countermeasures, and server 925 may be primarily configured to provide accounting and financial services. Accordingly, one or more of servers 910, 915, 920 and 925 may be configured to perform at least some of the functions of a verification module as described herein.

However, tasks may be apportioned among devices in any convenient fashion. For instance, host device 925 may allow an operator to monitor the activities of enterprise 905 and of gaming participants, but may also be involved in some aspects of data analysis/cheating detection. As described in more detail below, players' host devices may also be involved in some aspects of data gathering and analysis.

Telephone 930 allows direct verbal communication between personnel of enterprise 905 and others, including gaming participants. Storage devices 937 allow storage of data, including but not limited to accounting and financial data, game play data, player data, analyses, etc. In some implementations of the invention, storage is provided at another location, e.g., via a storage network. Such storage may, for example, provide data mirroring or other types of redundancy. Preferably, redundant blades, servers and/or other devices provide failover protection.

Firewall 935 is interposed between the devices of enterprise 905 and Internet 911. Game provider 905 provides wagering games to players in locations 960 and 970, and to wireless device 980, via Internet 911. In this example, location 960 includes laptop 965 and location 970 includes iBook™ 975. Wireless device 980 is a personal digital assistant in this example.

DSP 940 includes various devices for the acquisition and processing of player data, processing related requests, determining result codes, etc. In this example, these devices include PCs 945, servers 950 and storage devices 952, among other devices.

Financial institution 985 is also connected to Internet 911, via firewall 990. Financial institution 985 may be a bank, a credit union, a credit card company, or another such institution. Part of the online gaming process may involve the transfer of funds to and/or from network devices of financial institution 985. For example, enterprise 905 may also provide account reconciliation services, periodic reports or gaming wins and losses, etc., in connection with financial institution 985.

It will be appreciated that the implementations described herein could be provided via devices other than those illustrated in FIG. 9 and that other devices not shown in FIG. 9 may be used within the scope of the invention. For example, some methods and devices described in U.S. patent application Ser. No. 10/981,435, entitled "LOCATION AND USER IDENTIFICATION FOR ONLINE GAMING" and filed on Nov. 3, 2004, which is hereby incorporated by reference, may advantageously be used in connection with the present invention. Such devices include, but are not limited to, location detection devices and biometric devices (such as retinal scanners, hand and/or fingerprint scanners, voice recognition devices and the like).

Moreover, it will be appreciated that one or more networks other than Internet 911 may be used to implement various aspects of the invention, such as a satellite network, a wireless network, a metro optical transport, the PSTN, etc. Accordingly, a variety of protocols may be used for communication, such as Internet Protocol ("IP"), Fibre Channel ("FC"), FC over IP ("FCIP"), Internet SCSI ("iSCSI," an IP-based standard for linking data storage devices over a network and transferring data by carrying SCSI commands over IP networks), Dense Wavelength Division Multiplexing ("DWDM," an optical technology used to increase bandwidth over existing fiber optic backbones), or Code Division Multiple Access (CDMA, a wireless cellular communication technology).

Figure 10:
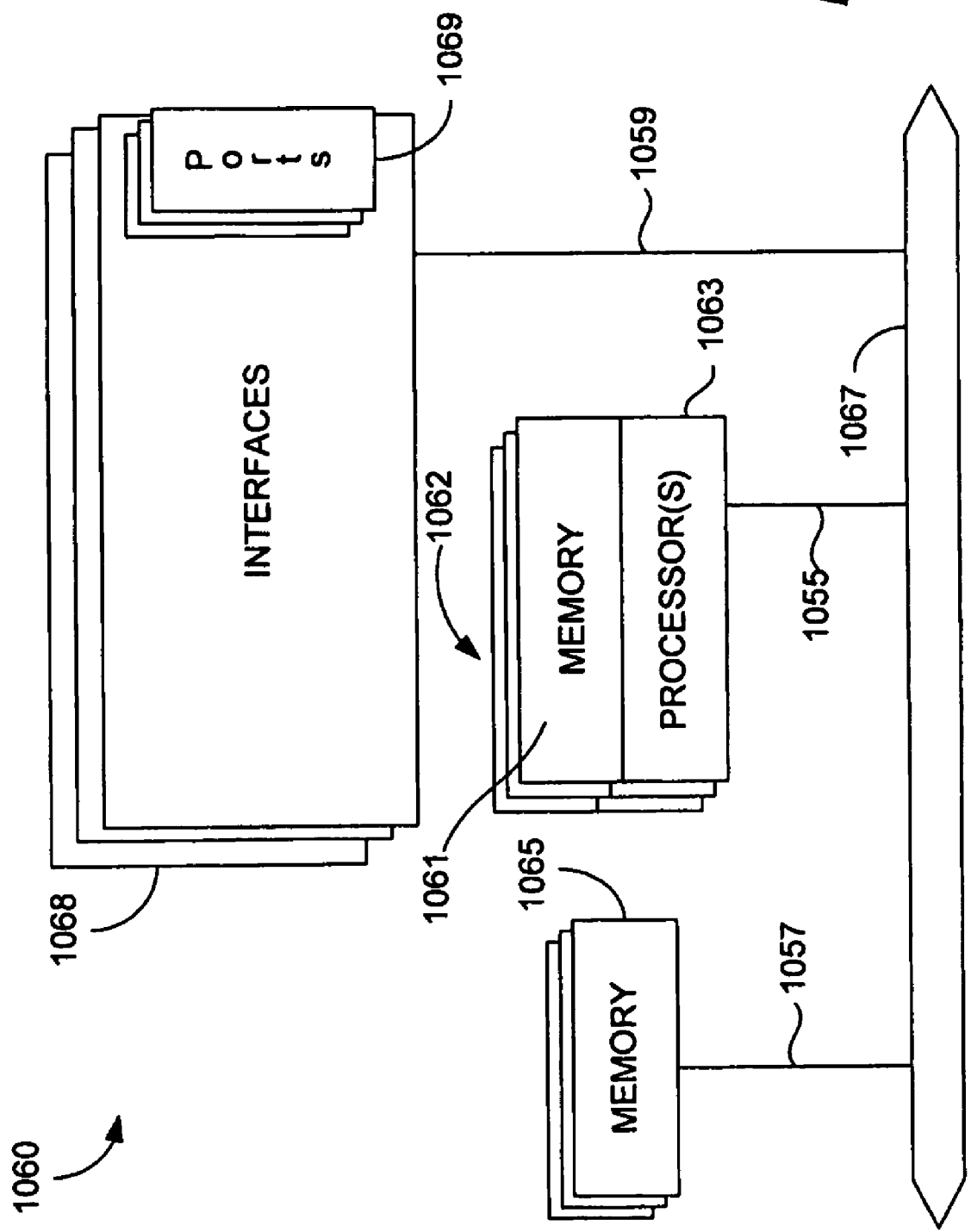
FIG. 10 depicts a network device that may be used for some implementations described herein.

FIG. 10 illustrates an example of a network device that may be configured for implementing some methods of the present invention. For example, one or more network devices 1060 may be configured to perform at least some of the functions of a verification module as described herein.

Network device 1060 includes a logic system that includes at least one logic device, such as master central processing unit ("CPU") 1062. Moreover, network device 1060 includes a bus 1067 (e.g., a PCI bus) and an interface system that includes interfaces 1068. Generally, interfaces 1068 include ports 1069 appropriate for communication with the appropriate media, e.g., via a network. In some embodiments, one or more of interfaces 1068 includes its own memory (e.g., random access memory ("RAM") such as volatile RAM. In addition, interfaces 1068 may include one or more logic devices, such as a processor, an application specific integrated circuit ("ASIC") or any other appropriate logic device. Accordingly, the logic device(s) of interfaces 1068 may be considered part of the logic system of network device 1060. According to some such embodiments, these independent processors perform, at least in part, some of the functions described herein. In some embodiments, one or more of interfaces 1068 control such communications-intensive tasks as encryption, decryption, compression, decompression, packetization, media control and management. By providing separate processors for the communications-intensive tasks, interfaces 1068 allow the master microprocessor 1062 efficiently to perform other functions such as routing computations, network diagnostics, security functions, etc.

The interfaces 1068 are typically provided as interface cards (sometimes referred to as "linecards"). Generally, interfaces 1068 control the sending and receiving of data packets over the network and sometimes support other peripherals used with the network device 1060. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1062 may be responsible for implementing specific functions associated with the functions of a desired network device. According to some embodiments, CPU 1062 accomplishes all these functions under the control of software including an operating system and any appropriate applications software.

CPU 1062 may include one or more processors 1063 such as a processor from the Motorola family of microprocessors or the MIPS family of microprocessors. In an alternative embodiment, processor 1063 is specially designed hardware for controlling the operations of network device 1060. In a specific embodiment, a memory 1061 (such as non-volatile RAM and/or ROM) also forms part of CPU 1062. However, there are many different ways in which memory could be coupled to the system. Memory block 1061 may be used for a variety of purposes such as, for example, caching and/or storing data, programming instructions, etc.

Regardless of network device's configuration, it may employ one or more memories or memory modules (such as, for example, memory block 1065) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). Examples of program instructions include both machine code, such as produced by a compiler, and files containing higher-level code that may be executed by the computer using an interpreter.

Although the system shown in FIG. 10 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 10) or switch fabric based (such as a cross-bar).

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the present embodiments are to be considered as illustrative and not restrictive, and the invention is not to be limited to the details given herein, but may be modified within the scope and equivalents of the appended claims.

We claim:

1. A non-transitory computer-readable medium having software stored thereon, the software including instructions for controlling at least one device to perform the following tasks:

receive age data and jurisdiction data regarding a person;

determine, according to the age data and jurisdiction data and without reference to data supplied about the person by a data service provider ("DSP"), whether the person is eligible for online wager gaming, the DSP being an information resource which can provide data about the person;

register the person if the person is determined to be eligible for online wager gaming;

receive, after the person is registered, an indication that the person desires to initiate an online wager gaming session;

obtain data about the person from at least one DSP;

verify, after receiving the indication and with reference to data about the person obtained from at least one DSP, whether the person is eligible for the online wager gaming session, and determine whether to provide the online wager gaming session according to an outcome of the verifying process.

2. The non-transitory computer-readable medium of claim 1, wherein the software includes instructions for controlling at least one device to provide the online wager gaming session if it is verified that the person is eligible for the online wager gaming session.

3. The non-transitory computer-readable medium of claim 1, wherein the software includes instructions for controlling at least one device to perform the following task if it is verified that the person is eligible for the online wager gaming session:

categorize, with reference to data supplied by at least one DSP, the person as belonging to one of a plurality of tiers, each tier having at least one corresponding monetary transaction limit.

4. The non-transitory computer-readable medium of claim 1, wherein the software includes instructions for controlling at least one device to do the following:

determine the available DSPs for the person's jurisdiction.

5. The non-transitory computer-readable medium of claim 3, wherein each tier has at least one monetary transaction limit for funds coming in and at least one monetary transaction limit for funds going out.

6. The non-transitory computer-readable medium of claim 3, wherein each tier has a temporal monetary transaction limit for each monetary transaction limit.

7. The non-transitory computer-readable medium of claim 4, wherein the software includes instructions for controlling at least one device to make a prioritization of the available DSPs and to obtain data from the DSPs according to the prioritization.

8. The non-transitory computer-readable medium of claim 7, wherein the software includes instructions for controlling at least one device to do the following:

determine whether a stop threshold has been attained; and stop obtaining DSP data if it is determined that a stop threshold has been attained.

9. An apparatus, comprising:

an interface system comprising at least one network interface; and a logic system comprising at least one logic device and configured to perform the following tasks:

receive, via the interface system, age data and jurisdiction data regarding a person;

determine, according to the age data and jurisdiction data and without reference to data supplied about the person by a data service provider ("DSP"), whether the person is eligible for online wager gaming, the DSP being an information resource which can provide data about the person;

communicate, via the interface system, with a device used by the person to register the person if the person is determined to be eligible for online wager gaming;

receive, after the person is registered and via the interface system, an indication that the person desires to initiate an online wager gaming session;

obtain, via the interface system, data about the person from at least one DSP;

verify, after receiving the indication and with reference to data about the person obtained from at least one DSP, whether the person is eligible for the online wager gaming session, and determine whether to provide the online wager gaming session according to an outcome of the verifying process.

10. The apparatus of claim 9, wherein the logic system is further configured to categorize, with reference to data supplied by at least one DSP, the person as belonging to one of a plurality of tiers, each tier having at least one corresponding monetary transaction limit.

11. The apparatus of claim 9, wherein the logic system is further configured to do the following:

determine the available DSPs for the person's jurisdiction.

12. The apparatus of claim 10, wherein each tier has at least one monetary transaction limit for funds coming in and at least one monetary transaction limit for funds going out.

13. The apparatus of claim 10, wherein each tier has a temporal monetary transaction limit for each monetary transaction limit.

14. The apparatus of claim 11, wherein the logic system is further configured to do the following:

make a prioritization of the available DSPs; and obtain data from the DSPs according to the prioritization.

15. The apparatus of claim 14, wherein the logic system is further configured to do the following:

determine whether a stop threshold has been attained; and stop obtaining DSP data if it is determined that a stop threshold has been attained.

16. An apparatus, comprising:

an interface system comprising at least one network interface; and a logic system comprising at least one logic device and configured to perform the following tasks:

receive, via the interface system, registration data regarding a person;

determine, according to the registration data and without reference to data supplied about the person by a data service provider ("DSP"), whether the person is eligible for online wager gaming, the DSP being an information resource which can provide data about the person;

communicate, via the interface system, an authorization to register the person if the person is determined to be eligible for online wager gaming;

receive, after the person is registered and via the interface system, an indication that the person desires to initiate an online wager gaming session;

make a verification, after receiving the indication, whether the person is eligible for the online wager gaming session, and determine whether to authorize the online wager gaming session according to an outcome of the verification.

17. The apparatus of claim 16, wherein the logic system is further configured to obtain, via the interface system, DSP data from at least one DSP.

18. The apparatus of claim 16, wherein the logic system is further configured to categorize the person as belonging to one of a plurality of tiers, each tier having at least one corresponding monetary transaction limit.

19. The apparatus of claim 17, wherein the logic system is further configured to make the verification based, at least in part, on the DSP data.

20. The apparatus of claim 18, wherein each monetary transaction limit corresponds with at least one temporal transaction limit.

* * * * *